United States Patent
Yoshida et al.

(10) Patent No.: US 7,991,547 B2
(45) Date of Patent: Aug. 2, 2011

(54) IN-VEHICLE INFORMATION APPARATUS AND IN-VEHICLE NAVIGATION APPARATUS FOR HIGH ALTITUDE APPLICATIONS

(75) Inventors: Masato Yoshida, Nagoya (JP); Makoto Tanaka, Anjo (JP)

(73) Assignee: Denso Corporation, Kariya (JP)

( * ) Notice: Subject to any disclaimer, the term of this patent is extended or adjusted under 35 U.S.C. 154(b) by 508 days.

(21) Appl. No.: 12/230,952

(22) Filed: Sep. 9, 2008

(65) Prior Publication Data

US 2009/0082959 A1   Mar. 26, 2009

(30) Foreign Application Priority Data

Sep. 26, 2007 (JP) ................................ 2007-250006

(51) Int. Cl.
*G01C 21/30* (2006.01)
(52) U.S. Cl. ................. 701/208; 701/200; 701/209
(58) Field of Classification Search .............. 701/200, 701/208, 209
See application file for complete search history.

(56) References Cited

U.S. PATENT DOCUMENTS

| | | | | |
|---|---|---|---|---|
| 7,171,305 B2* | 1/2007 | Minato et al. | ................ | 701/209 |
| 7,584,025 B2* | 9/2009 | Tanaka | ................ | 701/1 |
| 7,698,057 B2* | 4/2010 | Kobayashi et al. | ............ | 701/200 |
| 7,912,513 B2* | 3/2011 | Tanaka et al. | ............... | 455/569.2 |
| 2004/0267446 A1* | 12/2004 | Minato et al. | ................. | 701/209 |
| 2008/0065323 A1* | 3/2008 | Kobayashi et al. | ........... | 701/209 |
| 2008/0221789 A1* | 9/2008 | Oono | ............................ | 701/208 |
| 2009/0076724 A1* | 3/2009 | Kobayashi et al. | ........... | 701/209 |
| 2009/0164117 A1* | 6/2009 | Takashima | .................... | 701/201 |

* cited by examiner

*Primary Examiner* — Khoi Tran
*Assistant Examiner* — Brian J Broadhead
(74) *Attorney, Agent, or Firm* — Posz Law Group, PLC

(57) ABSTRACT

From among high upland area determination data stored in a hard disk drive, only a portion corresponding to a required segmental region is read into an external memory along with traveling of a vehicle. Determining of a high upland area is then executed based on the portion of the high upland determination in the external storage device. When a high-upland division is present in a vicinity of a present position, a portion of the high upland area determination data is read into the external memory. The read portion of the high upland area determination data corresponds to a high upland area, which covers all the high-upland divisions adjacently existing starting from the high-upland division in the vicinity of the present position. When a high-upland division is not present in the vicinity of the present position, a portion of the high upland area determination data corresponding to a segmental region having a predetermined minimum range centering on the present position is read into the external memory.

5 Claims, 5 Drawing Sheets

DIVISIONAL LINE

1 : HIGH UPLAND
0 : NO HIGH UPLAND

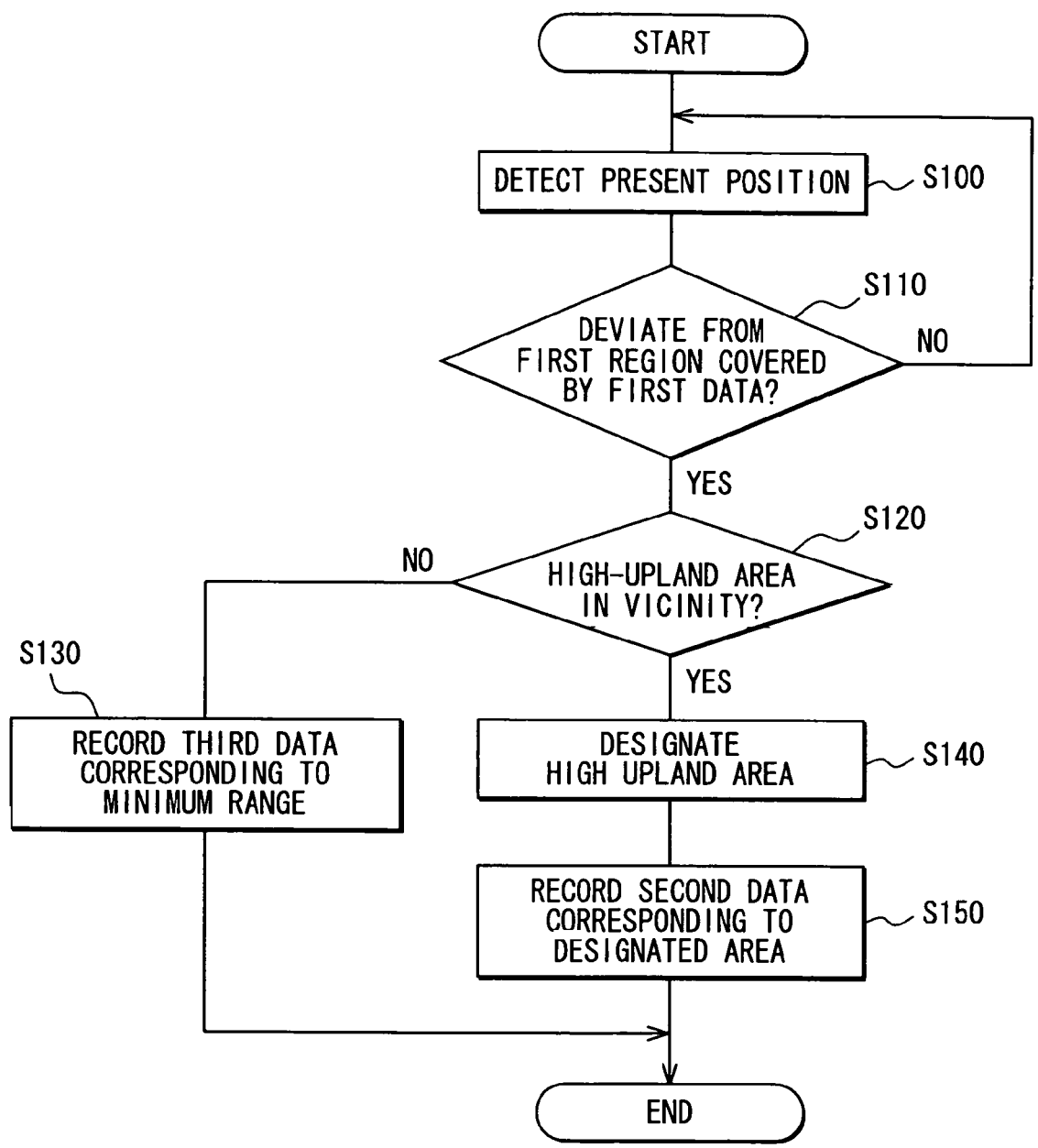

IN-VEHICLE INFORMATION APPARATUS AND IN-VEHICLE NAVIGATION APPARATUS FOR HIGH ALTITUDE APPLICATIONS

CROSS REFERENCE TO RELATED APPLICATION

This application is based on and incorporates herein by reference Japanese Patent Application No. 2007-250006 filed on Sep. 26, 2007.

FIELD OF THE INVENTION

The present invention relates to an in-vehicle information apparatus such as an in-vehicle navigation apparatus having a hard disk drive, and, in particular, to a data control for restricting an access to the hard disk drive in a high upland area.

BACKGROUND OF THE INVENTION

An in-vehicle apparatus such as a navigation apparatus displays a map of the vicinity of a present position on a display screen based on map data, and calculates an optimum route to a destination to thereby navigate the vehicle or driver. A storage medium to store the map data uses a hard disk drive. The hard disk drive, which has a large data volume, further stores music data, application software for operating the navigation apparatus, and image or audio data used in an audio function integrated into the navigation apparatus, in addition to the map data.

The hard disk drive is a storage medium where data are written and read with a magnetic head on a disk to which magnetic materials are applied. During the operation of the hard disk drive, the disk rotating at a high speed rotates an ambient air to generate a pressure. The magnetic head thereby marginally floats above the disk. If the hard disk drive operates under the environment where surrounding atmospheric pressure falls remarkably, the air pressure floating the magnetic head is decreased and the gap between the disk and magnetic head cannot be maintained in the proper state. As a result, the magnetic head may collide with the disk to thereby damage it. Since an atmospheric air pressure falls as an altitude rises, the hard disk drive has an application limit in altitude. Generally, the operation guarantee relative to the altitude for the hard disk drive is up to an altitude of 3000 m (about 0.7 atmosphere) to 5000 m (about 0.5 atmosphere).

The countermeasure for preventing damage of the hard disk drive mounted in the in-vehicle apparatus is thereby needed when used at a high upland (e.g., higher than 3000, 4000, or 5000 meters high) exceeding the guaranteed altitude where the operation of the hard disk drive is guaranteed.

Patent document 1 describes the following technology. When the relevant vehicle ascends up to a predetermined altitude (for example, 3000 m), some map data stored in the hard disk drive are copied or stored also into an external memory. The hard disk drive is then stopped; navigating is performed based on the map data stored in the external memory during the travel in the high upland area at an altitude not lower than 3000 m. Thus, such technology stops or disables the hard disk drive at a high upland area to thereby prevent the damage of the hard disk drive while allowing navigating.

Data is previously prepared for a method of a high upland area determination as to whether a relevant position is in a high upland area. A present position of a vehicle is referred to the prepared data so that the high upland area determination can be executed for the present position.

In such a method, for example, a region on a map or a map coordinate plane is divided into divisions every predetermined interval relative to latitude and longitude. Each division is assigned with high upland information indicating whether to include a high upland having an altitude equal to or greater than a predetermined altitude. Data for determining a high upland area (referred to as high upland area determination data) is prepared by including divisions assigned with the high upland information. A present position of a vehicle is thus referred to the high upland area determination data so that whether the present position is in a high upland area.

Since a hard disk drive may stop in a high upland area, it is necessary to perform high upland area determination based on the high upland area determination data even if the hard disk drive is stopping. For such necessity, it is important to previously store the high upland area determination data in a storage device other than the hard disk drive. Storing high upland area determination data corresponding to the whole of a map covering a country, a continent, or a global region needs to prepare a remarkably large data volume. In addition, when the data volume increases by updating the high upland area determination data, there is also a disadvantage that the storage capacity needs to be increased accordingly.

Patent document 1: JP-2004-317385 A

SUMMARY OF THE INVENTION

It is an object to provide a technology to enable determination as to whether a present position is included in a high upland area by using only a relevant portion, which is read into a storage device from high upland area determination data.

According to an example of the present invention, an in-vehicle information apparatus is provided as follows. A hard disk drive is included for storing data which is used for performing a predetermined process. A position detection device is included for detecting a present position. A prohibition portion is included for prohibiting an operation of the hard disk drive when the detected present position is determined to be in a high upland area including a high upland having an altitude equal to or greater than a predetermined altitude. A first storage medium is included in the hard disk drive for storing high upland determination area data which indicates whether each of predetermined divisions in a region corresponds to a high-upland division, which includes the high upland, the predetermined divisions being formed by dividing the region on a coordinate plane. A second storage medium is included for storing a first portion of the high upland determination area data corresponding to a first segmental region including divisions in the region. A determination data recording portion is included for reading a second portion of the high upland determination area data from the hard disk drive and recording the read second portion in the second storage medium when the present position deviates from the first segmental region, the second portion corresponding to a high upland area as a second segmental region, which includes high-upland divisions existing adjacently starting from a closest high-upland division, which is closest from a division corresponding to the detected present position. A high upland determination portion is included for determining whether a present position corresponds to a high-upland division by referring to the second portion of the high upland determination area data recorded in the second storage medium.

Herein, "a predetermined altitude" may signify, for instance, an upper limit of an altitude where an operation of the hard disk drive is guaranteed, or an altitude reaching a lower limit of an atmospheric pressure at which an operation of the hard disk drive is guaranteed.

Under the above configuration, the second storage medium records only the required part on the basis of the present position of the vehicle among the high upland area determination data for the whole region stored in the hard disk drive. The storage capacity for storing necessary high upland area determination data used for a high upland area determination can be reduced significantly. In addition, when the vehicle exits from a segmental region covered by the high upland area determination data recorded in the second storage medium, the next or successive portion of the high upland area determination data is read into the second storage medium. Thus, availability of the high upland area determination data for the high upland area determination can be always maintainable.

Further, a segmental region corresponding to a portion of the high upland area determination data read into the second storage medium includes a division corresponding to the present position and adjacently existing high-upland divisions starting from the high-upland division adjacent to the division corresponding to the present position. Thus, even if the vehicle enters a high upland area while the hard disk drive thereby stops, the high upland area determination can be continuable by using the portion of the high upland area determination data recorded in the second storage medium. This can securely maintain the high upland area determination data required for the high upland area determination.

As another example of the present invention, an in-vehicle navigation apparatus is provided as follows. The above in-vehicle information apparatus is included, wherein the hard disk drive of the in-vehicle information apparatus further stores map data. A navigation control portion is included for navigating along a route to a destination based on the map data.

As yet another example of the present invention, a method is provided for recording data to determining a high upland area in a vehicle having a hard disk drive that stores data which is used for performing a predetermined process, the hard disk drive being disabled in a high upland having an altitude equal to or greater than a predetermined altitude. The method comprises: (i) storing, in a first storage medium included in the hard disk drive, high upland determination area data which indicates whether each of predetermined divisions in a region corresponds to a high-upland division, which includes the high upland, the predetermined divisions being formed by dividing the region on a coordinate plane; (ii) storing, in a second storage medium, a first portion of the high upland determination area data corresponding to a first segmental region including divisions in the region; (iii) reading a second portion of the high upland determination area data from the hard disk drive while recording the read second portion in the second storage medium when the present position deviates from the first segmental region, the second portion corresponding to a high upland area as a second segmental region, which includes high-upland divisions existing adjacently starting from a closest high-upland division, which is closest from a division corresponding to the detected present position; and (iv) determining whether a present position corresponds to a high-upland division by referring to the second portion of the high upland determination area data recorded in the second storage medium.

As still yet another example of the present invention, a computer readable medium is provided as follows. The computer readable medium comprises instructions being executed by a computer is provided, wherein the instructions includes the above method for recording determination data, the method being computer-implemented.

BRIEF DESCRIPTION OF THE DRAWINGS

The above and other objects, features, and advantages of the present invention will become more apparent from the following detailed description made with reference to the accompanying drawings. In the drawings:

FIG. 3 is a flowchart of a high upland determination data management process;

DETAILED DESCRIPTION OF THE PREFERRED EMBODIMENTS

The following describes an embodiment of the present invention with reference to drawings.

1. Configuration of In-Vehicle Navigation Apparatus

Figure 1:
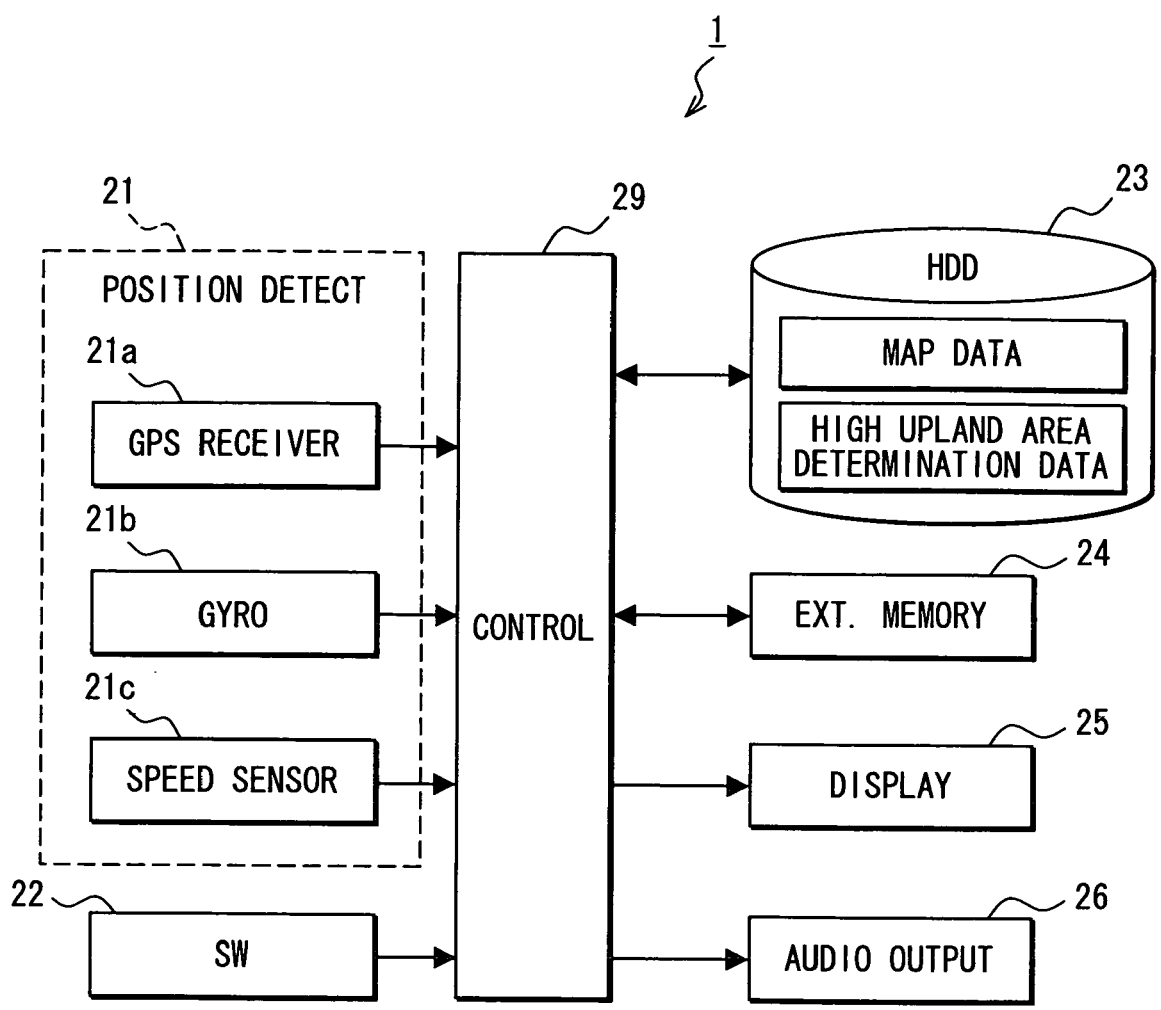
FIG. 1 is a block diagram showing a configuration of an in-vehicle navigation apparatus according to an embodiment of the present invention.

FIG. 1 is a block diagram showing a configuration of an in-vehicle navigation apparatus mounted in a vehicle as an in-vehicle information apparatus according to an embodiment of the present invention.

As illustrated in FIG. 1, the in-vehicle navigation apparatus 1 includes the following: a position detection device 21 used for detecting a present position of the vehicle; an operation switch group 22 for inputting various instructions from a user; a hard disk drive (HDD) 23 which is a large data volume storage medium as a first storage medium for storing map data, high upland area determination data to be explained later, etc.; an external memory 24 as a second storage medium for storing a variety of information; a display device 25 for performing various displays such as a map display; an audio output device 26 for outputting various kinds of guidance audios etc.; and a control device 29.

The position detection device 21 includes the following: a GPS (Global Positioning System) receiver 21a to receive transmit radio waves from satellites for GPS via a GPS antenna and detect a position coordinate of the vehicle as a present position; a gyroscope 21b for outputting a detection signal according to an angle of a rotational movement exerted to the vehicle; and a speed sensor 21c for outputting a detection signal according to a speed of the vehicle. The individual sensors or the like 21a to 21c have different types of detection errors from each other; therefore, they are used to complement each other.

The operation switch group 22 includes a mechanical key switch arranged in the circumference of the display device 25 and a touch sensitive panel integrated into a surface of the screen on the display device 25. The hard disk drive 23 is a storage device which integrally includes a hard disk for storing information, a magnetic head for writing and reading information in the hard disk, a driving portion, and a controller. The hard disk drive 23 reads data from the hard disk based on the control from the control device 29, and inputs the read data to the control device 29. The hard disk drive 23 stores the following data: map data including (i) road data used for map matching, route retrieval, route guidance, etc., and (ii) drawing data for map display; route guidance data; a program for operating the in-vehicle navigation apparatus 1; and high upland area determination data. In addition, the hard disk drive 23 is assumed to be guaranteed a normal operation in an operating environment at an altitude of 5000 m or less, or at an atmospheric pressure of a 0.5 atm or more.

Figure 2A:
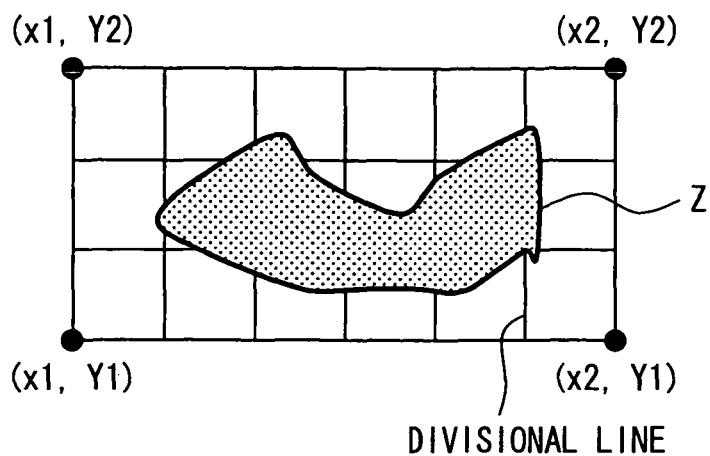
FIGS. 2A, 2B are drawings schematically illustrating an outline of data for determining a high upland area.
Figure 2B:
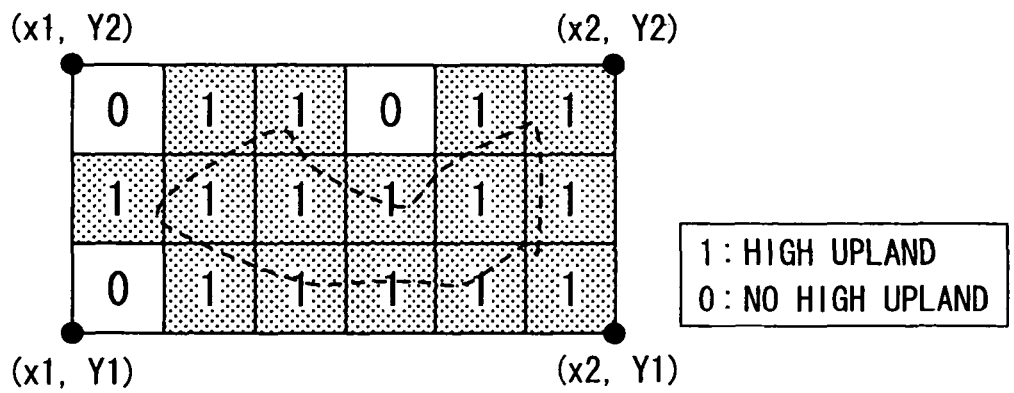

Here, the high upland area determination data recorded or stored in the hard disk drive 23 is explained based on FIGS. 2A, 2B. FIGS. 2A, 2B illustrate an outline of the high upland area determination data. The high upland area determination data are assigned individually with signs for identifying whether each of divisions in meshes corresponds to or is included in a high upland area. Herein, the divisions in meshes are formed by dividing a region on a map coordinate plane at predetermined intervals of latitude and longitude.

For example, FIG. 2A shows a map coordinate region having four corner points or vertexes of latitude and longitude coordinates (X1, Y1), (X2, Y1), (X1, Y2), and (X2, Y2). Herein, a high upland area typically having an altitude equal to or greater than 5000 m high is shown as a shaded portion surrounded by the bold line around a center of the region. When generating the high upland area determination data corresponding to the above map coordinate region, the region needs to be divided more finely into the divisions, for instance, 18 divisions in FIG. 2A. As illustrated in FIG. 2B, if a division includes a high upland, for instance, which has an altitude equal to or greater than 5000 m high altitude, such high-upland division is assigned with a sign "1." In contrast, if a division does not include a high upland, such a division is assigned with a sign "0." Thus defined high upland area determination data may be prepared with respect to the whole of a map coordinate region covering a wide region such a country, a continent, a global range based on the map data stored in the hard disk drive 23. Further, the high upland area determination data are prepared as a table, which defines whether each division corresponds to a high-upland division or includes a high upland having an altitude equal to or greater than a predetermined altitude (e.g., 5000 m).

The explanation is returned to FIG. 1. The external memory 24 is used for storing a portion of the high upland area determination data stored in the hard disk drive 23. The external memory 24 uses a storage medium or device, such as a non volatile semiconductor memory, in which memory contents are electrically or magnetically rewritable and retained even at power-off.

The display device 25 is a color display device having a display screen such as a liquid crystal display. The display device 25 can display various images on the display screen according to inputs of video signals from the control device 29. For example, while the vehicle travels, the display device 25 displays a navigational display window to illustrate, in superimposition, (i) a mark for indicating a present position specified based on detection signals obtained from the position detection device 21 and the map data from the hard disk drive 23, (ii) a guidance route to a destination, and (iii) additional data including names, landmarks, symbols for the landmarks, etc.

The audio output device 26 is used for notifying a user of a variety of information by voice. Thus, a variety of information such as route guidance can be notified to a user in both image displaying via the display device 25 and audio sounding via the audio output device 26.

The control device 29 includes a known microcomputer having a CPU, ROM, RAM, I/O, and a bus line connecting the foregoing components or the like. The control device 29 performs the various processes based on program or data read from the ROM, the hard disk drive 23, or the external memory 24.

For example, navigational processes include a map display process, and a route guidance process. The map display process calculates a present position of the vehicle based on each detection signal from the position detection device 21 and reads map data of a vicinity of the calculated present position from the hard disk drive 23 to thereby display a map of the vicinity of the present position in the display device 25. In addition, the route guidance process calculates a guidance route which is an optimal route from a present position to a destination based on position data stored in the hard disk drive 23 and a destination designated via the operation switch group 22, and navigates a user up to the destination in consideration of the relation between the present position and the guidance route. The technique of designating the guidance route automatically uses, for instance, the known Dijkstra method as a cost calculation method.

Herein, the in-vehicle navigation apparatus 1 is assumed to be used in a high upland area, which may be defined as an upland area equal to or greater than a predetermined altitude, for instance, 5000 meters high. For instance, the predetermined altitude may correspond to a maximum altitude guaranteed for a normal operation of the hard disk drive 23. Therefore, when the relevant vehicle accesses a high upland area at an altitude of not less than 5000 m, the control device 29 prohibits the operation of the hard disk drive 23 to prevent damage due to operating the hard disk drive 23 in the high upland area. Thus, the control device 29 may function as an example of a prohibition means or portion for prohibiting an operation of the hard disk drive 23 or for disabling the hard disk drive 23.

The high upland area determination data is used for high upland area determination as to whether the present position is in a high upland area. For instance, a division corresponding to a position coordinate of the detected present position is referred to in the high upland area determination data, and a sign of "1" or "0" assigned to that division is read. Based on the result of the reference to the relevant division or data, it is determined whether the present position is included in a high upland area or a division corresponding to the present position corresponds to a high-upland division. Thus, a present position of a vehicle is referred to in the high upland area determination data so that whether the present position is in a high upland area can be determined.

Since the hard disk drive 23 is stopped in a high upland area, it is necessary to perform the high upland area determination based on the high upland area determination data even if the hard disk drive 23 is stopping. Thus, the control device 29 performs the following high upland area determination data management process as a characteristic process of the embodiment.

Along with traveling of the vehicle, the control device 29 reads a relevant portion from the high upland area determination data stored in the hard disk drive 23. The control device 29 then records or stores the read relevant portion into the external memory 24. The relevant portion of the high upland area determination data corresponds to a required segmental region on the basis of the present position among the high upland area determination data, which is stored in the hard disk drive 23 for the whole of a map region. If a high-upland division is present in a predetermined vicinity of a division corresponding to the present position, a relevant portion of the high upland area determination data is read into the external memory. The relevant portion of the high upland area determination data corresponds to a high upland area, which covers all the high-upland divisions adjacently existing starting from the high-upland division in the vicinity of the division corresponding to the present position. In contrast, if a high-upland division is not present in the predetermined vicinity of the division corresponding to the present position, a relevant portion corresponding to a segmental region having a minimum range centering on the present position of the vehicle is read into the external memory 24. Determining of a high upland area (or a high upland area determination) is then executed based on such a portion of the high upland determination in the external memory 24. The detail of the high upland area determination data management process is mentioned later.

Thus, the control device 29 can function as an example of a determination data recording means or portion and as an example of a high upland determination means or portion.

2. High Upland Area Determination Data Management Process

Hereafter, a high upland area determination data management process by the control device 29 is explained with reference to FIGS. 3 to 5C.

FIG. 3 is a flowchart of a high upland determination data management process. The process is repeatedly executed at predetermined time intervals during the traveling of the vehicle in parallel with various processes such as the above-mentioned map display process and the route guidance process.

The control device 29 detects a present position of the vehicle based on an input detection signal from the position detection device 21 at S100. It is then determined at S110 whether the detected present position deviates from a geographical range or a first segmental region covered by a first portion of the high upland area determination data stored in the external memory 24. When it is determined that the present position does not deviate from the first segmental region (S110: NO), the processing returns to S100.

In contrast, when it is determined that the present position deviates from the first segmental region (S110: YES), the processing proceeds to S120. At S120, the high upland area determination data in the hard disk drive 23 is referred to; then, it is determined whether a high-upland division is present within a predetermined range or vicinity of the present position. The predetermined vicinity of the present position is defined as a predetermined segmental region including (i) the division corresponding to the present position as a central division and (ii) peripheral eight divisions surrounding the central division. When it is determined that a high-upland division is not present in the vicinity (S120: NO), a third portion of the high upland area determination data is read as corresponding to a third segmental region having a minimum range centering on the division corresponding to the present position from the hard disk drive 23. Note that a second portion of the high upland area determination data or a second segmental region will be explained later. The third portion of the high upland area determination data is substituted for the first portion of the high upland area determination data currently held in the external memory 24, and is newly recorded in the external memory 24 at S130. In addition, the third segmental region can be defined as including adjacently existing nine divisions (3×3 in longitudinal and latitudinal directions) centering on the division corresponding to the present position.

Figure 4A:
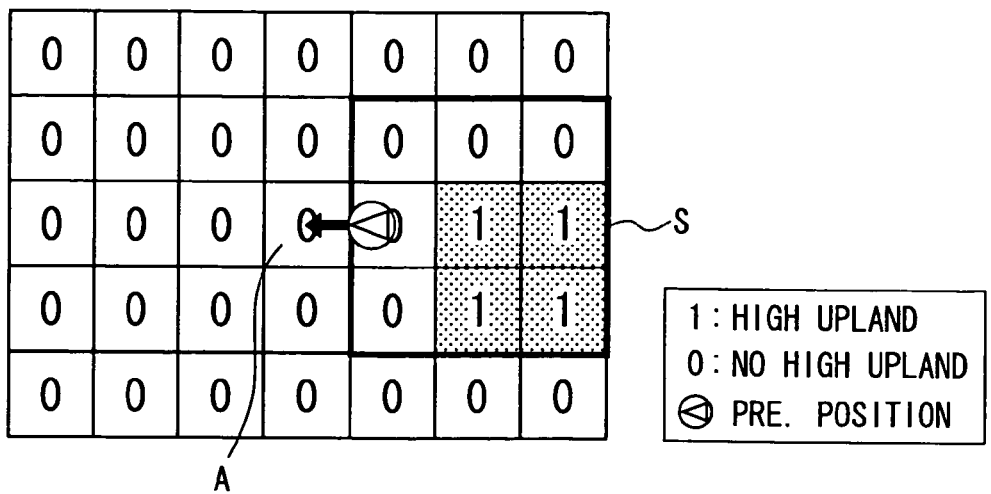
FIGS. 4A to 4C are diagrams illustrating an example of a process for determining a relevant portion of high upland determination data.
Figure 4B:
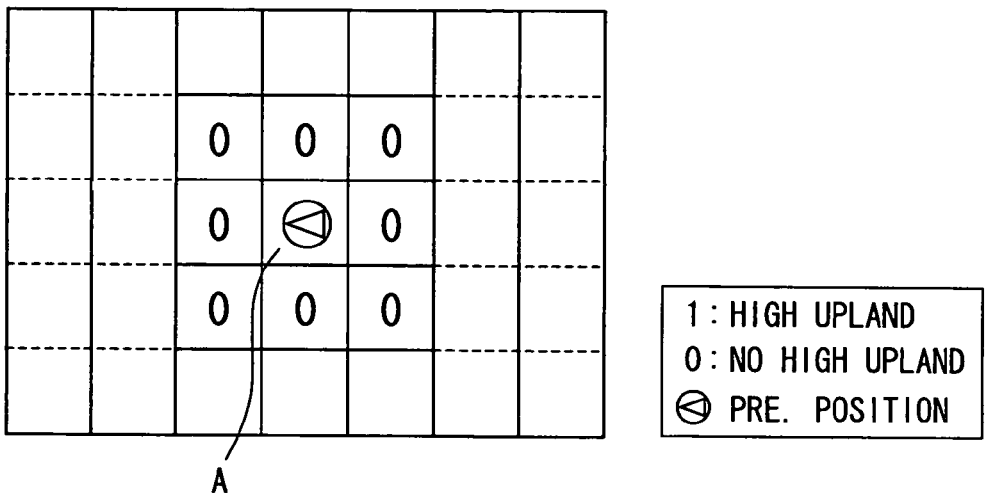
Figure 4C:
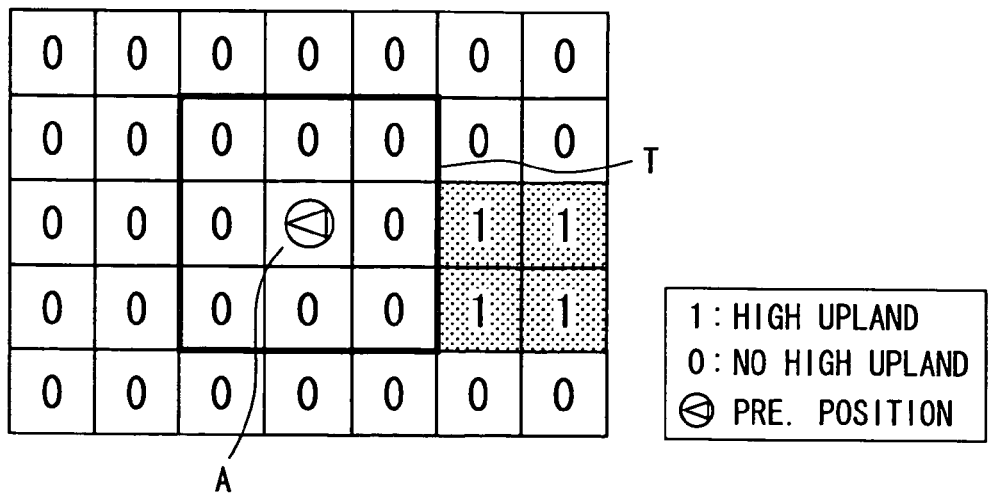

Here, the flow of the processing at S120 and S130 is explained based on FIGS. 4A to 4C. FIGS. 4A to 4C illustrate an example of a process for determining the above third portion of the high upland determination data.

With reference to FIG. 4A, for instance, the present position of the vehicle deviates from the first segmental region S corresponding to or covered by the first portion of the high upland area determination data currently held in the external memory 24 while entering a division A. In such a case, it is determined whether a high-upland division is included in a segmental region, which includes mutually adjacent nine divisions while centering on the division A.

If a high-upland division is not included in the above segmental region centering on the division A as shown in FIG. 4B, the control device 29 reads the third portion of the high upland area determination data corresponding to the third portion T in FIG. 4C having a minimum range centering on the division A from the hard disk drive 23 into the external memory 24.

The explanation is returned to the flowchart of FIG. 3. In contrast, when it is determined that a high-upland division is present in the vicinity (S120: YES), a high upland area is designated at S140 to obtain or read a relevant second portion of the high upland area determination data from the hard disk drive 23 as a rectangular second segmental region at least including the high-upland division present in the vicinity of the division A and its contiguously adjacent high-upland divisions. The second portion of the high upland area determination data corresponding to the designated high upland area is read from the hard disk drive 23, the newly read second portion of the high upland area determination data is substituted for the first portion of the high upland area determination data currently held in the external memory 24, and is newly recorded in the external memory 24 at S150.

Figure 5A:
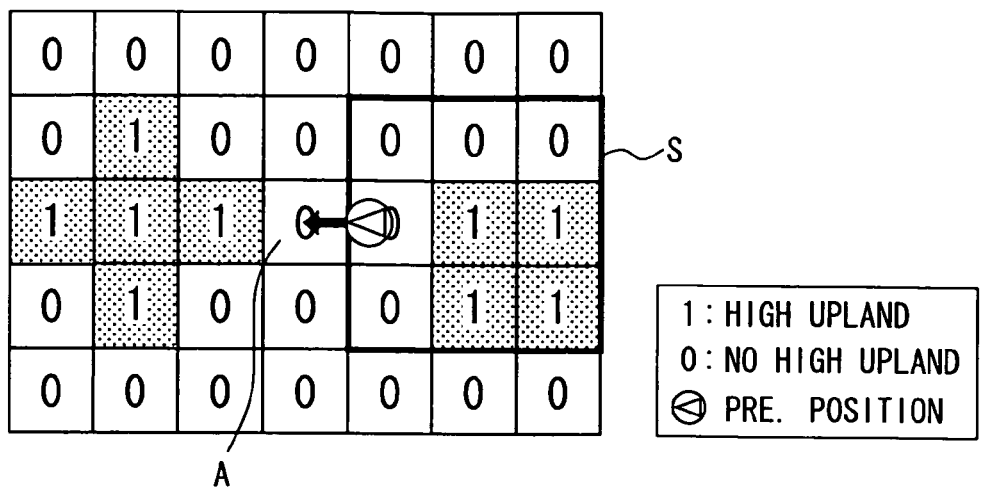
FIGS. 5A to 5C are diagrams illustrating another example of a process for determining a relevant portion of high upland determination data.
Figure 5B:
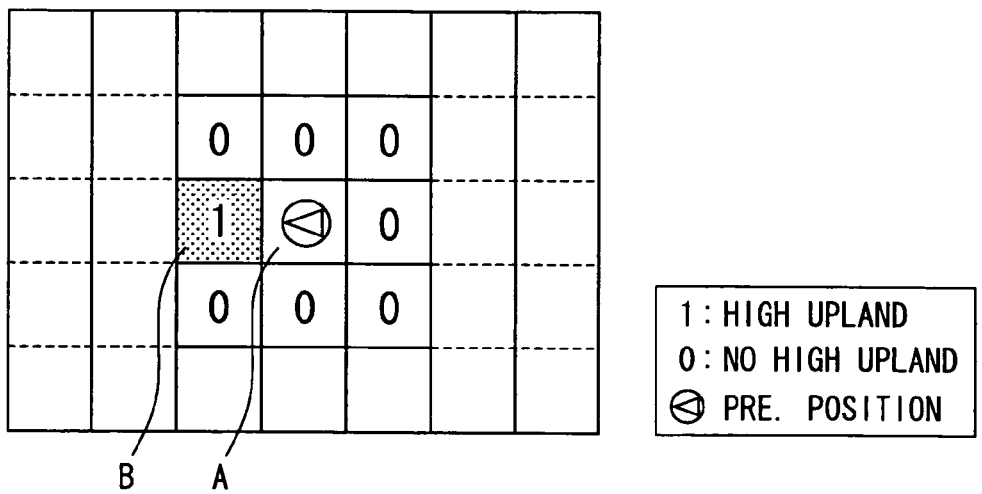
Figure 5C:
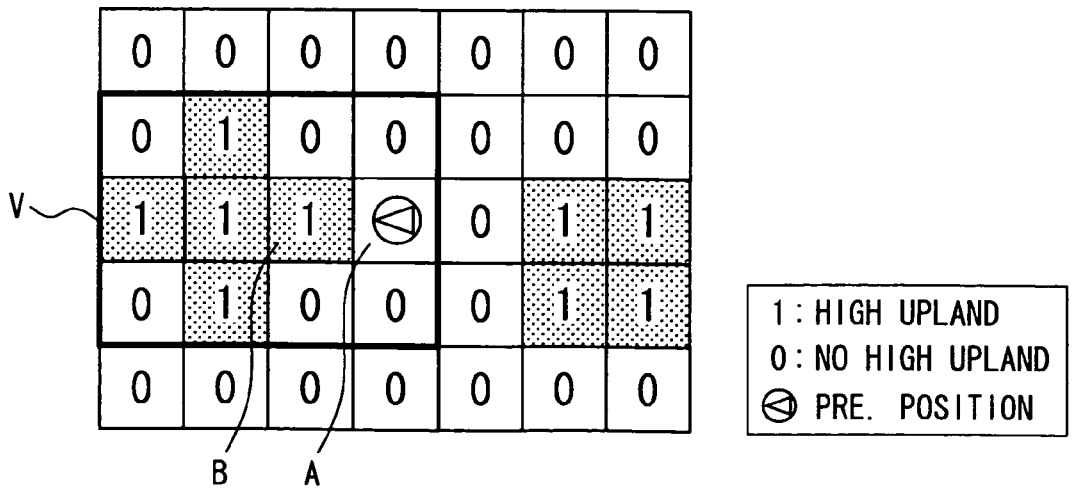

Here, the flow of the processing at S120, S140, and S150 is explained based on FIGS. 5A to 5C. FIGS. 5A to 5C illustrate an example of a process for determining the above second portion of the high upland determination data.

With reference to FIG. 5A, for instance, the present position of the vehicle deviates from the first segmental region S corresponding to the first portion of the high upland area determination data currently held in the external memory 24 while entering a division A. Then it is determined whether a high-upland division is included in a segmental region, which includes mutually adjacent nine divisions while centering on the division A in similarity with the above explanation.

If a high-upland division B is included in the above segmental region centering on the division A as shown in FIG. 5B, the control device 29 reads the second portion of the high upland area determination data corresponding to a high upland area from the hard disk drive 23 into the external memory 24. As illustrated in FIG. 5C, the high upland area includes a rectangular segmental region V as the second segmental region at least including high-upland divisions adjacently existing from the high-upland division B next to the division A.

3. Effect

According to the in-vehicle navigation apparatus 1 of the present embodiment, the following effects may be obtained.

(1) Only a required portion based on a present position of the vehicle is read from the high upland area determination data for a whole map region stored in the hard disk drive 23 and is stored in the external memory 24. Thus, the required storage capacity for storing the portion of the high upland area determination data used for the high upland area determination can be reduced. In addition, when the present position of the vehicle deviates from the first segmental region corresponding to the first portion of the high upland area determination data currently held in the external memory 24, a new portion of the high upland area determination data based on the present position is read into the external memory 24. Thus, availability of the high upland determination area data for the high upland area determination can be always maintainable.

(2) A segmental region corresponding to a portion of the high upland area determination data read into the external memory 24 from the hard disk drive 23 includes a division corresponding to the present position and adjacently existing high-upland divisions starting from the high-upland division adjacent to the division corresponding to the present position. Thus, even if a vehicle enters a high upland area while the hard disk drive 23 thereby stops, a high upland area determination can be continuable by using the portion of the high upland area determination data stored in the external memory 24. This can securely maintain the high upland area determination data required for the high upland area determination.

(3) When the present position of the vehicle deviates from the first segmental region corresponding to the first portion of the high upland area determination data currently held in the external memory 24, a segmental region corresponding to a portion of the high upland area determination data read into the external memory 24 can be reduced when a predetermined vicinity of the present position does not include a high upland area. In other words, if a high upland area does not exist near the present position, the vehicle does not immediately enter a high upland area. Therefore, in such a case, the high upland area determination can be sufficed by securing a limited portion of the high upland area determination data corresponding to the limited vicinity of the vehicle. Thus, only when the vehicle thereafter approaches a high upland area, it is necessary to acquire a portion of the high upland area determination data covering the high upland area. This allows as few divisions, which are not a high-upland divisions, as possible to be read into the external memory 24 as the second storage medium. As a result, a data volume stored in the second storage medium can be decreased. This makes it possible to further save the storage capacity for storing and accumulating high upland area determination data.

4. Other Embodiments

Although the embodiment is described above, the present invention is not limited to the embodiment and can be modified in various manners. For example, the present invention is applicable not only to the in-vehicle navigation apparatus 1 of the above embodiment but also to an in-vehicle apparatus, such as a car audio apparatus which uses a hard disk drive as a data storage medium.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. An in-vehicle information apparatus comprising:
a hard disk drive that stores data which is used for performing a predetermined process;
a position detection device that detects a present position;
a prohibition portion for prohibiting an operation of the hard disk drive when the detected present position is determined to be in a high upland area including a high upland having an altitude equal to or greater than a predetermined altitude;
a first storage medium included in the hard disk drive for storing high upland determination area data which indicates whether each of predetermined divisions in a region corresponds to a high-upland division, which includes the high upland, the predetermined divisions being formed by dividing the region on a coordinate plane;
a second storage medium for storing a first portion of the high upland determination area data corresponding to a first segmental region including divisions in the region;
a determination data recording portion for reading a second portion of the high upland determination area data from the hard disk drive and recording the read second portion in the second storage medium when the present position deviates from the first segmental region, the second portion corresponding to a high upland area as a second segmental region, which includes high-upland divisions existing adjacently starting from a closest high-upland division, which is closest from a division corresponding to the detected present position; and
a high upland determination portion for determining whether a present position corresponds to a high-upland division by referring to the second portion of the high upland determination area data recorded in the second storage medium.

2. The in-vehicle information apparatus according to claim 1, wherein
If a high-upland division is not present within a predetermined range centering on a division corresponding to the present position when the present position deviates from the first segmental region recorded in the second storage medium,
the determination data recording portion is further configured to read a third portion of the high upland area determination data in the hard disk drive and records the read third portion in the second storage medium, the third portion corresponding to a third segmental region corresponding to a predetermined minimum range centering on the division corresponding to the present position.

3. An in-vehicle navigation apparatus, comprising:
the in-vehicle information apparatus according to claim 1, wherein the hard disk drive of the in-vehicle information apparatus further stores map data; and
a navigation control portion configured to navigate along a route to a destination based on the map data.

4. A method for recording data to determining a high upland area in a vehicle having a hard disk drive that stores data which is used for performing a predetermined process, the hard disk drive being disabled in a high upland having an altitude equal to or greater than a predetermined altitude,
the method comprising:
storing, in a first storage medium included in the hard disk drive, high upland determination area data which indicates whether each of predetermined divisions in a region corresponds to a high-upland division, which includes the high upland, the predetermined divisions being formed by dividing the region on a coordinate plane;
storing, in a second storage medium, a first portion of the high upland determination area data corresponding to a first segmental region including divisions in the region;
reading a second portion of the high upland determination area data from the hard disk drive while recording the read second portion in the second storage medium when the present position deviates from the first segmental region, the second portion corresponding to a high upland area as a second segmental region, which includes high-upland divisions existing adjacently starting from a closest high-upland division, which is closest from a division corresponding to the detected present position; and
determining whether a present position corresponds to a high-upland division by referring to the second portion of the high upland determination area data recorded in the second storage medium.

5. A computer readable medium comprising instructions being executed by a computer, wherein the instructions includes the method for recording determination data according to claim 4, the method being computer-implemented.

* * * * *